United States Patent
Radcliffe et al.

(10) Patent No.: US 11,055,486 B2
(45) Date of Patent: *Jul. 6, 2021

(54) NUTRIENT CONTENT IDENTIFICATION METHOD AND APPARATUS

(71) Applicant: MyFitnessPal, Inc., San Francisco, CA (US)

(72) Inventors: Paul Radcliffe, San Francisco, CA (US); Karlo Berket, San Francisco, CA (US); Chul Lee, Mountain View, CA (US); Jiang Xu, Sunnyvale, CA (US); Bryan Levine, Oakland, CA (US); Karthik Subramaniam, San Francisco, CA (US); Mark Allen, San Francisco, CA (US)

(73) Assignee: MyFitnessPal, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,981

(22) Filed: Mar. 3, 2020

(65) Prior Publication Data
US 2020/0272789 A1    Aug. 27, 2020

Related U.S. Application Data

(63) Continuation of application No. 16/428,416, filed on May 31, 2019, now Pat. No. 10,635,749, which is a continuation of application No. 15/684,120, filed on Aug. 23, 2017, now Pat. No. 10,346,534, which is a
(Continued)

(51) Int. Cl.
*G10L 15/00* (2013.01)
*G06F 40/205* (2020.01)

(52) U.S. Cl.
CPC .................................. *G06F 40/205* (2020.01)

(58) Field of Classification Search
None
See application file for complete search history.

(56) References Cited

U.S. PATENT DOCUMENTS

| | | | |
|---|---|---|---|
| 6,478,736 B1 | 11/2002 | Mault | |
| 9,805,021 B2 * | 10/2017 | Radcliffe | G06F 40/205 |
| 10,346,534 B2 * | 7/2019 | Radcliffe | G06F 40/205 |

(Continued)

*Primary Examiner* — Satwant K Singh
(74) *Attorney, Agent, or Firm* — Maginot, Moore & Beck, LLP

(57) ABSTRACT

Methods for calculating nutrient content information. In one embodiment, the methods comprise: receiving a recipe having a list of ingredients and quantities, for each of the ingredients a corresponding record is found within a database of known records, the records are associated to quantities and nutritional values. The units of measurement of the recipe ingredients and the identified record are compared. When the units are the same, no conversion is performed. When the units are different, the units of the known record are converted using a conversion factor derived from a relationship between the differing units of measurement. In one variant, the conversion factor may be identified from a table of conversion factors relating various units of measurement to one another. Finally, the converted or the known nutritional values are multiplied by a ratio of the quantity of the ingredient in the recipe to the quantity of the known record.

20 Claims, 6 Drawing Sheets

Related U.S. Application Data continuation of application No. 14/805,778, filed on Jul. 22, 2015, now Pat. No. 9,805,021.

(60) Provisional application No. 62/028,218, filed on Jul. 23, 2014.

(56) References Cited

U.S. PATENT DOCUMENTS

| | | |
|---|---|---|
| 10,635,749 B2 * | 4/2020 | Radcliffe .............. G06F 40/205 |
| 2006/0074716 A1 | 4/2006 | Tilles |
| 2009/0099873 A1 | 4/2009 | Kurple |
| 2009/0131089 A1 | 5/2009 | Micali |
| 2009/0275002 A1 | 11/2009 | Hoggle |
| 2012/0005222 A1 | 1/2012 | Bhagwan |
| 2012/0096087 A1 | 4/2012 | Curcelli |
| 2012/0136731 A1 | 5/2012 | Kidron |
| 2014/0377725 A1 | 12/2014 | Kidron |
| 2015/0242468 A1 | 8/2015 | Shoemaker |
| 2015/0339394 A1 | 11/2015 | Jinq |
| 2016/0071431 A1 | 3/2016 | Jain |
| 2016/0103910 A1 | 4/2016 | Kim |
| 2016/0188712 A1 | 6/2016 | Radcliffe |

* cited by examiner all_unit_conversions

| quantity_1 | int |
|---|---|
| unit_1 | varchar |
| quantity_2 | int |
| unit_2 | varchar |
| Add field | | selected_ingredients

| user | varchar |
|---|---|
| original_text | varchar |
| selected_food | varchar |
| selected_weight | varchar |
| selected_quantity | int |
| Add field | | learned_conversions

| selected_food | varchar |
|---|---|
| selected_weight | varchar |
| selected_quantity | int |
| matched_food | varchar |
| matched_weight | varchar |
| matched_quantity | int |
| number_selected | int |
| first_seen | date |
| last_seen | date |
| Add field | |

NUTRIENT CONTENT IDENTIFICATION METHOD AND APPARATUS

PRIORITY AND RELATED APPLICATIONS

The present disclosure is a continuation of and claims priority to co-owned, co-pending U.S. patent application Ser. No. 16/428,416, filed on May 31, 2019, which is a continuation of and claims priority to U.S. patent application Ser. No. 15/684,120, filed on Aug. 23, 2017, which is a continuation of and claims priority to U.S. patent application Ser. No. 14/805,778 filed on Jul. 22, 2015 and co-owned U.S. Provisional Patent Application No. 62/028,218 filed on Jul. 23, 2014, all of the same title and incorporated herein by reference in their entireties.

TECHNICAL FIELD

The present disclosure relates to the field of data processing. More particularly, the present disclosure relates to recipe detail identification method and apparatus.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Currently, if an individual would like to discover the nutritional contents from an ingredient line in a recipe, they would have to first retrieve the nutritional contents for a suggested serving of that food item, and then either calculate or guess the corresponding quantity as specified in the recipe. The undertaking could be difficult in many cases, especially when ingredient quantities are vague, e.g., one apple, or missing entirely, e.g., in the case of cooking spray.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 3 illustrates a number of example tables of the food and beverage database of FIG. 1, according to various embodiments.

DETAILED DESCRIPTION

Overview

Figure 1:
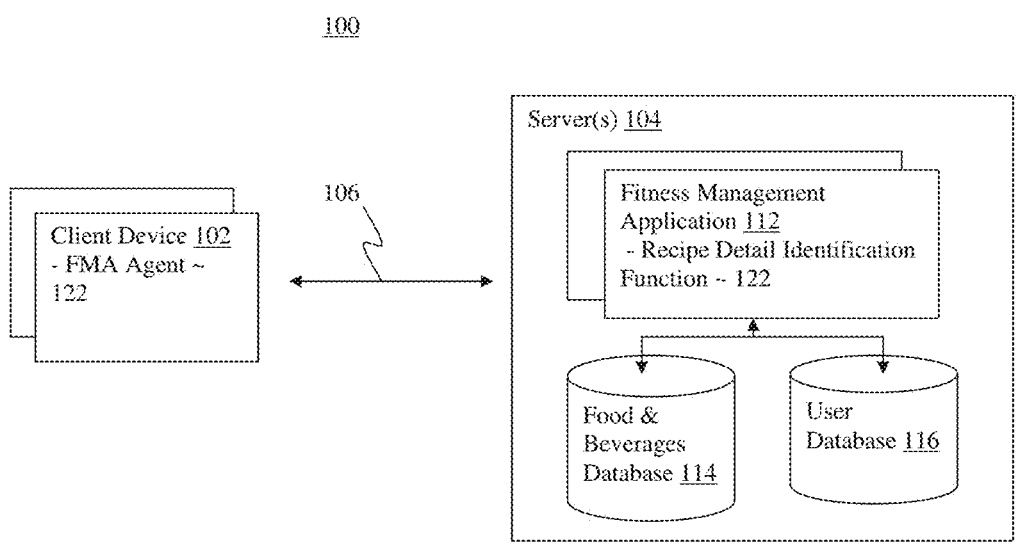
FIG. 1 illustrates a fitness management system suitable for practicing the present disclosure, according to the various embodiments.

Techniques are provided for calculating nutrient content information. A server that hosts a fitness management application receives text information that describes food recipe information. The serer parses the text information to identify relevant food information. The relevant food information includes a first text portion that corresponds to food ingredient information and a second text portion that corresponds to food quantity information. The server matches the food ingredient information to the first text portion with a known food ingredient in a database of food ingredient information. The server converts the food quantity information in the second text portion to a known food quantity type. The server calculates nutrient content information of the food ingredient information using nutritional information of the known food ingredient and the known food quantity type.

Example Embodiments

Disclosed embodiments include apparatus, method and storage medium associated with fitness management application in general, and recipe detail identification in particular.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Referring now to FIG. 1, wherein a fitness management system, according to the various embodiments, is illustrated. As shown, fitness management system (FMS) 100 may include client devices 102 and one or more servers 104 coupled with each other. Server(s) 104 may host a fitness management application (FMA) 112, including a number of databases, e.g., food and beverages database 114 and user database 116, configured in accordance to the teachings of the present disclosure. Whereas each client device 102 may include a client side agent 122 of FMA 112 configured to access and interact with FMA 112, to enable a user of the client device 102, among other things, to develop a fitness plan that may include a food and beverage budget, and monitor the progress towards meeting the plan, to be described more fully below.

In embodiments, servers 104, except for FMA 112 and databases 114-116, may be any one of a number of computer servers known in the art, including but are not limited to servers available from Dell Computing of Austin, Tex. or Hewlett Packard of Palo Alto, Calif. In embodiments, FMA 112 may include recipe detail identification function 122 configured to provide nutritional information about recipe ingredients. Recipe detail identification function 122 may further include logic for converting between different units of measures, e.g., between a cup and fluid oz, between fluid oz and milliliters, and so forth. Recipe detail identification function 122 may also be configured to respond to an inquiry from a client device, as well as a call from other components of FMA 112. In embodiments, food & beverages database 114 may include recipes and ingredient items, as well as food and beverage items, including nutrient information for various units of measures. Examples of nutrient information may include, but is not limited to, amount of sodium, carbohydrates, calcium, various vitamins and calories per serving size of various units of measures. Additionally database 114 may also include a unit of measure and/or quantity substitution table with entries containing unit of measure and/or quantity substitutions. A number of example tables 300 of the F&B database 114, including a unit of measure conversion table, are shown in FIG. 3.

In embodiments, client devices 102 may be any one of a number of stationary or portable electronic devices known in the art, including but are not limited to, desktop computers available from Dell Computing of Austin, Tex., or smartphones, computing tablets, laptop computers, electronic readers, personal digital assistants, and so forth, such as Galaxy S4 from Samsung Electronics of Seoul, Korea, or iPad from Apple Computer of Cupertino, Calif. In embodiments, one or more portable computing devices 102 may be a wearable computing device, e.g., a smart watch, a smart eyeglasses, and so forth. In embodiments, FMA agent 122 may be a generic browser, such as Internet Explorer, available from Microsoft Corp., of Redmond, Wash., or Safari from Apple Computer of Cupertino, Calif., e.g., in cases where client devices 102 are desktop or tablet computers. In other embodiments, FMA agent 122 may be a client side application, e.g., in cases where client devices 102 are personal digital assistants or smartphones.

In embodiments, client devices 102 and server(s) 104 may be communicatively coupled with one another via communication links 106 over one or more wired and/or wireless, private and/or public networks, including the Internet. Each of client devices 102 and server(s) 104 may be configured with the appropriate networking communication interfaces. An example of wired communication interface may include but is not limited Ethernet, while examples of wireless communication interfaces may include but are not limited to near field communication (NFC), Bluetooth, WiFi, 4G or 5G LTE. In between the communication interfaces of client devices 102 and server(s) 104 may be any number of gateways, routers, switches, based stations, and so forth.

Figure 2:
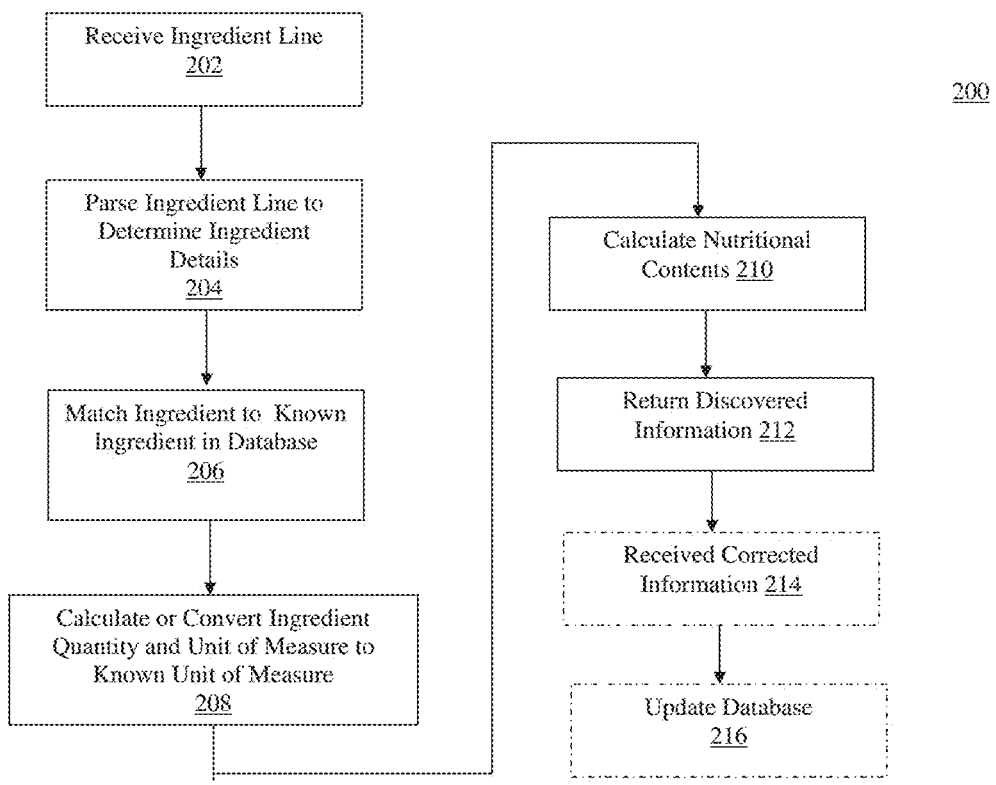
FIG. 2 illustrates an example operation flow of the recipe detail identification of FIG. 1 in further details, according to the various embodiments.

Referring now FIG. 2, wherein a method for recipe detail identification, in accordance with various embodiments, is shown. As illustrated, method 200 for recipe detail identification may include operations performed in blocks 202-216. The operations may be performed, e.g., by earlier described recipe detail identification function 122 of FMA 112 of FIG. 1.

At block 202, an ingredient line in raw text may be received. The raw text may also be described herein as text information that describes a food recipe. On receipt, from block 202, process 200 may proceed to block 204.

At block 204, the text information of ingredient line may be parsed for ingredient names, ingredient quantities, ingredient units of measures, as well as any other relevant information included in the ingredient line. Examples of other relevant information may include, but are not limited to, ingredient alternatives, unit of measure alternatives, preparation modifiers, notes, and so forth. In one example, the text information of the ingredient line may have multiple portions of relevant information. For example, the text information of the ingredient line may have a first text portion that corresponds to food ingredient information and a second text portion that corresponds a food quantity information. Once the ingredient line has been parsed, from block 204, process 200 may proceed to block 206.

At block 206, using the obtained information, an attempt is made to match the determined ingredient (e.g., the food ingredient information) to known ingredient in the database. In embodiments, the matching may be performed through a cascading matching system that conducts a cascading series of searches ordered by confidence accuracy. The cascading matching system may be multi-level and parallelized, including levels, such as: "Does this ingredient match the description of another ingredient previously selected for this particular recipe in the database," "Does this ingredient match the description of another ingredient previously selected in the database," or "Does this ingredient match the description of another ingredient in the database." In embodiments, the levels of cascading may be rearranged, added, or removed depending on the structure of the ingredient being analyzed. Once the ingredient has been matched, from block 206, process 200 may proceed to block 208.

At block 208, the quantity and unit of measure of the parsed ingredient item (e.g., the food quantity information) may be converted to the quantity and unit of measure of the matched ingredient (e.g., a known food quantity type). If the parsed unit of measure of the parsed ingredient is directly convertible to the known unit of measure (e.g., tablespoons, cups, and so forth), the quantity and unit of measure are mathematically converted. For example if the parsed unit of measure is 1 cup, and the matched ingredient has the measure of 1 tablespoon, the unit of measure for the parsed unit is mathematically calculated to 16 tablespoons. If the unit of measure is unknown or cannot be mathematically converted, substitution units of measure and quantity are looked up and retrieved from the unit substitution table. For example, if the parsed unit of measure is 1 cup, and the unit substitution table looks up the ingredient description and finds an entry that dictates 1 tablespoon converts to 2 ounces, then the unit of measure for the parsed ingredient is converted to 32 ounces. This conversion is done by first converting the parsed unit of measure from 1 cup to 16 tablespoons, then by converting the 16 tablespoons to 32 ounces (1 tablespoon=2 ounces). On conversion, from block 208, process 200 may proceed to block 210.

At block 210, nutrient contents for the ingredient line may be calculated, using the matched ingredients, calculated units of measure and/or quantities. For a given quantity of an individual food, the amount of each nutritional content is known. Taking the conversion from process 200 we can use that conversion rate to recalculate the nutritional content. For example, food A has 100 calories per 100 grams. The calculation from process 200 tells us that we have 32 ounces of food A. We also can determine based on known weight conversions that 1 ounce=10 grams. We will then calculate that 32 ounces of food A is equal to 320 grams. 320 grams at 100 calories per 100 grams equals 320 calories. On calculation, process 200 may proceed to block 212.

At block 212, the resulting detail information in terms of matched ingredients, converted or substituted unit of measures and quantities are returned to the caller. On return, from block 212, the process may end if the caller is another component of FMA 112, or process 200 may optionally proceed to block 214, if the caller is a client device.

At optional block 214, recipe detail identification function may receive another call from the client device with any correction to the information returned. On receipt, from block 214, process 200 may proceed to block 216.

At block 216, using the correction information, the cascading matching system, and/or the unit substitution table may be updated. For example, if a user corrects a match of 1 lb to equal 8 ounces. We will store the correction in any applicable database. This information will be presented to future users through the matching system and as a possible unit substitution. When the conversion is confirmed by a later user, it will then be added as a possible match to the cascading matching system. On update, from block 216, process 200 may end.

Figure 4:
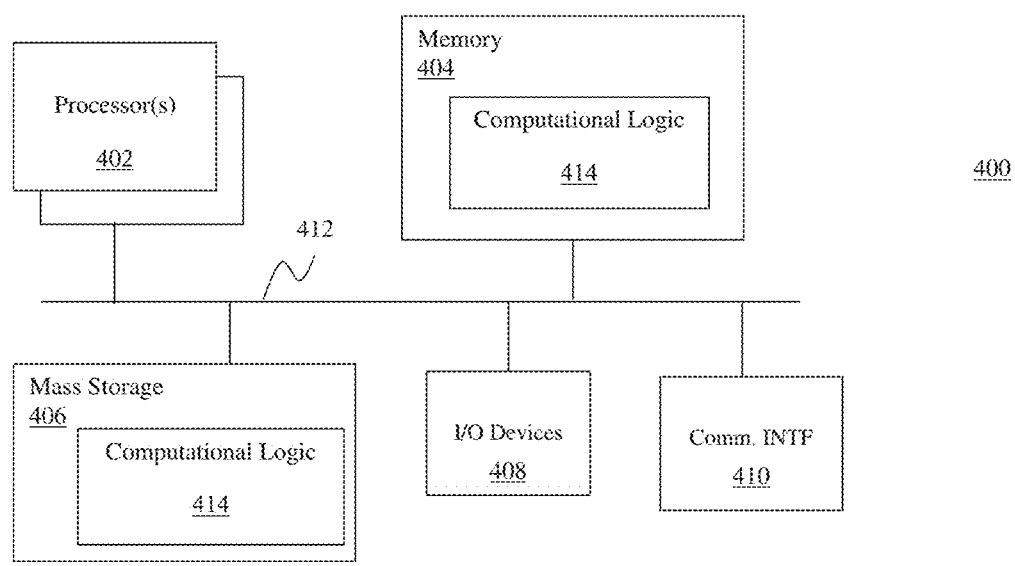
FIG. 4 illustrates an example computing system suitable for use as a fitness management server or a client device, according to various embodiments.

Referring now to FIG. 4, wherein an example computer suitable for use as computing device 114 or portable client device 104 of FIG. 1, in accordance with various embodiments, is illustrated. As shown, computer 400 may include one or more processors or processor cores 402, and system memory 404. For the purpose of this application, including the claims, the terms "processor" and "processor cores" may be considered synonymous, unless the context clearly requires otherwise. Additionally, computer 400 may include mass storage devices 406 (such as diskette, hard drive, compact disc read only memory (CD-ROM) and so forth), input/output devices 408 (such as display, keyboard, cursor control and so forth) and communication interfaces 410 (such as network interface cards, modems and so forth). The elements may be coupled to each other via system bus 412, which may represent one or more buses. In the case of multiple buses, they may be bridged by one or more bus bridges (not shown).

Each of these elements may perform its conventional functions known in the art. In particular, when used as computing device 114, system memory 404 and mass storage devices 406 may be employed to store a working copy and a permanent copy of the programming instructions implementing the operations associated with recipe detail identification function 122 earlier described, shown as computational logic 422. The various elements may be implemented by assembler instructions supported by processor(s) 402 or high-level languages, such as, for example, C, that can be compiled into such instructions.

The permanent copy of the programming instructions may be placed into permanent storage devices 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on whether computer 400 is used as computing device 114 or portable client device 104. When used as portable client device 104, computing device 400 may be a smartphone, computing tablet, ereader, ultrabook or laptop. Otherwise, the constitutions of elements 410-412 are known, and accordingly will not be further described.

Figure 5:
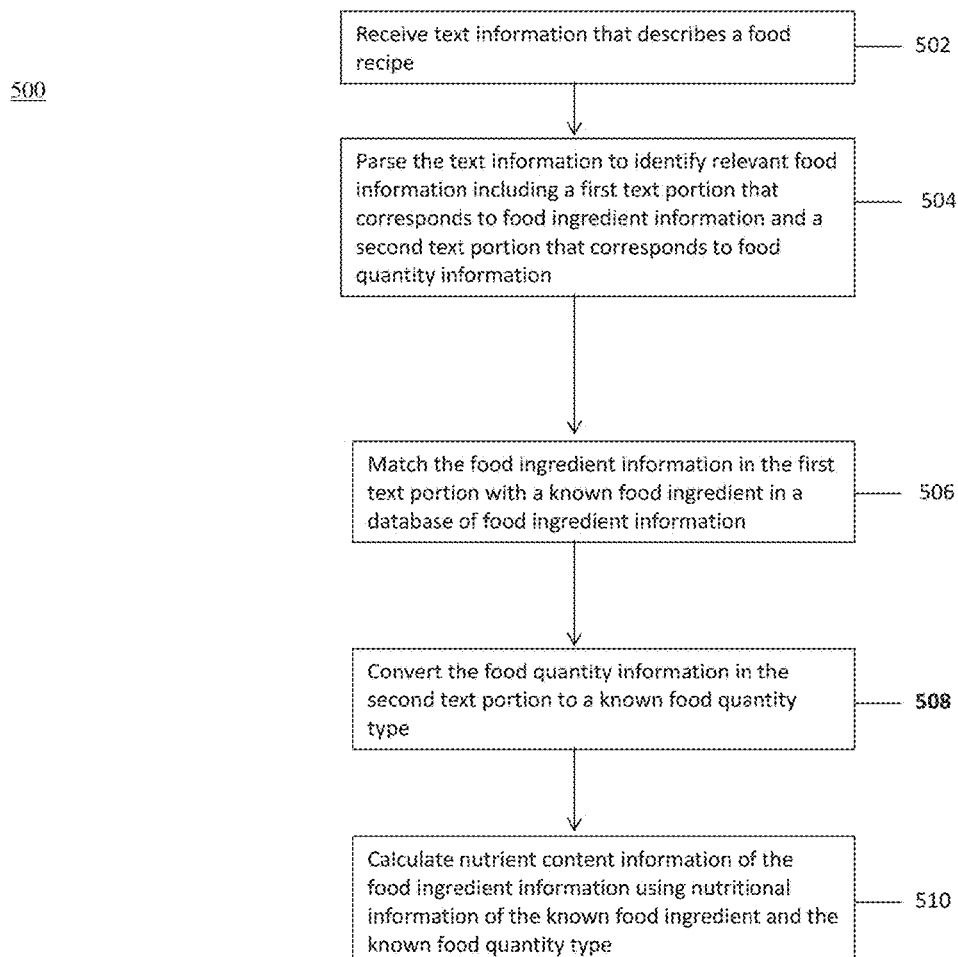
FIG. 5 shows an example flow chart depicting operations for determining nutrition information of recipes.

FIG. 5 shows an example flow chart 500 depicting operations performed by the server 104 to determine nutritional information of recipes. At 502, the server 102 receives text information that describes a food recipe. The server 102, at 504, parses the text information to identify relevant food information including a first text portion that corresponds to food ingredient information and a second text portion that corresponds to food quantity information. At 506, the server 102 matches the food ingredient information in the first text portion with a known food ingredient in a database of food ingredient information. The server 102, at 508, converts the food quantity information in the second text portion to a known food quantity type. At operation 510, the server 102 calculates nutrient content information of the food ingredient information using nutritional information of the known food ingredient and the known food quantity type.

Figure 6:
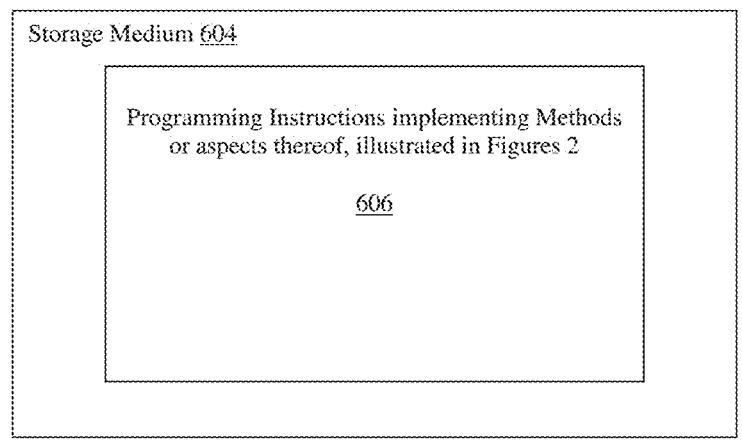
FIG. 6 illustrates an example storage medium having instructions to cause a computing device to practice aspects of the fitness management application, recipe detail identification function in particular, according to various embodiments.

FIG. 6 illustrates an example computer-readable non-transitory storage medium having instructions configured to practice all or selected ones of the operations associated with earlier described recipe detail identification function 122, in accordance with various embodiments. As illustrated, non-transitory computer-readable storage medium 602 may include a number of programming instructions 604. Programming instructions 604 may be configured to enable a device, e.g., computer 400, in response to execution of the programming instructions, to perform, e.g., various operations of process 200 of FIG. 2, e.g., but not limited to, the operations associated with recipe detail identification function 122. In alternate embodiments, programming instructions 604 may be disposed on multiple computer-readable non-transitory storage media 602 instead. In alternate embodiments, programming instructions 604 may be disposed on computer-readable transitory storage media 602, such as, signals.

In summary, a method is provided comprising: at a server device that hosts a fitness management application, receiving text information that describes a food recipe; at the server, parsing the text information to identify relevant food information including a first text portion that corresponds to food ingredient information and a second text portion that corresponds to food quantity information; at the server, matching the food ingredient information in the first text portion with a known food ingredient in a database of food ingredient information; at the server, converting the food quantity information in the second text portion to a known food quantity type; and at the server, calculating nutrient content information of the food ingredient information using nutritional information of the known food ingredient and the known food quantity type.

In addition, an apparatus is provided comprising: a communication unit; a memory; and a processor coupled to the communication unit and the memory and configured to: receive, via the communication unit, text information that describes a food recipe; parse the text information to identify relevant food information including a first text portion that corresponds to food ingredient information and a second text portion that corresponds to food quantity information; match the food ingredient information in the first text portion with a known food ingredient in a database of food ingredient information; convert the food quantity information in the second text portion to a known food quantity type; and calculate nutrient content information of the food ingredient information using nutritional information of the known food ingredient and the known food quantity type.

Furthermore, a computer-readable, non-transitory storage medium is provided that has computer executable instructions and when the instructions are executed, the instructions are operable to: receive text information that describes a food recipe; parse the text information to identify relevant food information including a first text portion that corresponds to food ingredient information and a second text portion that corresponds to food quantity information; match the food ingredient information in the first text portion with a known food ingredient in a database of food ingredient information; convert the food quantity information in the second text portion to a known food quantity type; and calculate nutrient content information of the food ingredient information using nutritional information of the known food ingredient and the known food quantity type.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method comprising:
    receiving a recipe comprising a plurality of ingredient descriptors and a quantity associated with each of said one or more ingredient descriptors;
    reviewing a database comprising a plurality of known records, each of said plurality of known records comprising a known descriptor, a known quantity, and a plurality of known nutritional values, said known nutritional values being calculated based at least in part on said known quantity;
    for each of said plurality of ingredient descriptors of said recipe, identifying within said database, a corresponding one of said plurality of known records, said corresponding ones being selected based on a match between said known descriptor and individual ones of said one or more ingredient descriptors;
    when it is determined that a first unit of measurement of said quantity of an individual one of said one or more ingredient descriptors is not a same unit as a second unit of measurement of said corresponding known quantity, adjusting said known nutritional values using a conversion factor derived from a relationship between said first and second units of measurement to arrive at adjusted nutritional values;
    when it is determined that said first unit of measurement is a same unit of measurement as said second unit of measurement, omitting any adjustment to said known nutritional values; and
    calculating one or more nutritional values for said recipe using said quantity associated with each of said one or more ingredient descriptors and either said adjusted nutritional values or said known nutritional values to arrive at an updated recipe.

2. The method of claim 1, further comprising: providing said calculated one or more nutritional values to a portable computing device; and
    enabling a user of said portable computing device to indicate consumption of at least a portion of said recipe via selection of an identifier of said recipe, said indication causing a respective at least portion of said calculated one or more nutritional values to be entered into a nutrition logging application.

3. The method of claim 2, wherein said portable computing device comprises a same device as that from which said recipe was received; and
    said portable computing device being further configured to run said nutrition logging application on a processor thereof.

4. The method of claim 1, wherein said match between said known descriptor and individual ones of said one or more ingredient descriptors comprises performance of a cascading series of searches of ingredient descriptors in said database.

5. The method of claim 1, wherein said act of adjusting using said conversion factor further comprises selecting said conversion factor from a conversion table comprising a plurality of conversion factors, each of said plurality of conversion factors relating individual ones a plurality of units of measurement to other individual ones of said plurality of units of measurement, said act of selecting comprising identifying said conversion factor which relates said first and said second units of measurements.

6. The method of claim 1, wherein said act of calculating said one or more nutritional values comprises: creating a ratio of said quantity associated with individual ones of said one or more ingredient descriptors and said corresponding known quantity; and
    multiplying each of said one or more nutritional values by said ratio.

7. The method of claim 1, further comprising: sending said one or more nutritional values for said recipe to a user device;
    receiving at least one modification relating to at least one of: said one or more nutritional values, said quantity, and said units of measurement; and
    modifying said updated recipe based at least in part on said at least one modification.

8. A server comprising:
    a transceiver;
    a storage apparatus; and
    a processor configured to execute at least one computer-readable application stored at said storage apparatus, said computer-readable application comprising a plurality of instructions which are configured to, when executed, cause said processor to:
        receive a recipe via said transceiver apparatus, said recipe comprising a plurality of ingredients and a respective plurality of quantities having units of measurement;
        access a database comprising a plurality of known records to identify for each of said plurality of ingredients a corresponding known ingredient record, each of said plurality of known records comprising at least an ingredient name, a known quantity in a known unit of measurement, and a plurality of known nutritional values which are based at least in part on said known quantity, and said identification being based on a match between individual ones of said ingredients and said ingredient names of individual ones of said plurality of known records;

compare said unit of measurement of individual ones of said plurality of ingredient quantities to said unit of measurement of said known ingredient record corresponding thereto, and when said units of measurement are not identical, convert said known nutritional values using a conversion factor to arrive at converted nutritional values; and create a ratio of said quantity individual ones of said plurality of ingredients to said known quantity of said known ingredient record corresponding thereto, and multiply said converted nutritional values or said known nutritional values by said ratio to arrive at adjusted nutritional values.

9. The server of claim 8, wherein said conversion factor is selected from a table comprising a plurality of conversion factors, each conversion factor representing a relationship between two units of measurement, said selected conversion factor comprising a one of said plurality of conversion factors indicative of a relationship between said unit of measurement of said individual ones of said plurality of ingredient quantities and said unit of measurement of said known ingredient record corresponding thereto.

10. The server of claim 8, wherein said plurality of instructions are further configured to, when executed, when said units of measurement are identical, omit any conversion and use said known nutritional values in said multiplication.

11. The server of claim 8, wherein said plurality of instructions are further configured to, when executed, output said adjusted nutritional values to a portable computing device via said transceiver.

12. The server of claim 11, wherein said plurality of instructions are further configured to, when executed: receive from said portable computing device a correction to at least one of: said one or more nutritional values, said quantity, and said units of measurement; utilize said correction to modify at least one of said adjusted nutritional values, said ratio, or conversion factor; and re-preform said comparison and said creation.

13. The server of claim 11, wherein said plurality of instructions are further configured to, when executed: receive from said portable computing device a selection of said recipe for entry thereof into a nutrition log and an identification of an amount thereof; and utilize said selection and said amount to determine a total for each of said one or more nutritional values, said total being based at least in part on said amount.

14. The server of claim 8, wherein said match between individual ones of said ingredients and said ingredient names of individual ones of said plurality of known records comprises performance of a cascading series of searches in said database.

15. A method comprising:
receiving a recipe comprising a plurality of ingredients and a respective plurality of quantities having units of measurement;

identifying for each of said plurality of ingredients a corresponding known ingredient record within a database comprising a plurality of known records, each of said plurality of known records comprising at least an ingredient name, a known quantity in a known unit of measurement, and a plurality of known nutritional values which are based at least in part on said known quantity;

comparing said unit of measurement of individual ones of said plurality of ingredient quantities to said unit of measurement of said known ingredient record corresponding thereto;

when said units of measurement are not identical, converting said known nutritional values using a conversion factor to arrive at converted nutritional values;

when said units of measurement are identical, omitting any conversion; and multiplying said converted nutritional values or said known nutritional values by a ratio of said quantity individual ones of said plurality of ingredients to said known quantity of said known ingredient record corresponding thereto to arrive at adjusted nutritional values.

16. The method of claim 15, wherein said act of multiplying comprises when said units of measurement are not identical, multiplying said converted nutritional values by said ratio; and when said units of measurement are identical, multiplying said known nutritional values by said ratio.

17. The method of claim 15, wherein said act of identifying comprises finding a match between individual ones of said ingredients and said ingredient names of individual ones of said plurality of known records via a cascading series of searches in said database.

18. The method of claim 15, further comprising examining a table comprising a plurality of conversion factors to select said conversion factor used in said act of converting, each of said plurality of conversion factors representing a relationship between two units of measurement, said selected conversion factor comprising a one of said plurality of conversion factors indicative of a relationship between said unit of measurement of said individual ones of said plurality of ingredient quantities and said unit of measurement of said known ingredient record corresponding thereto.

19. The method of claim 15, further comprising: outputting said adjusted nutritional values to a user device; receiving from said user device a correction to at least one of: said one or more nutritional values, said quantity, and said units of measurement; utilizing said correction to modify at least one of said adjusted nutritional values, said ratio, or conversion factor; and re-preforming said act of comparing and said act of creating.

20. The method of claim 15, further comprising: outputting said adjusted nutritional values to a user device; receiving from said user device a selection of said recipe for entry thereof into a nutrition log and an identification of an amount thereof; and utilize said selection and said amount to determine a total for each of said one or more nutritional values, said total being based at least in part on said amount.

* * * * *